US009884932B2

(12) United States Patent
Kobilka et al.

(10) Patent No.: US 9,884,932 B2
(45) Date of Patent: Feb. 6, 2018

(54) FLAME-RETARDANT IMPACT MODIFIER

(71) Applicant: International Business Machines Corporation, Armonk, NY (US)

(72) Inventors: Brandon M. Kobilka, Tucson, AZ (US); Joseph Kuczynski, North Port, FL (US); Jacob T. Porter, Highland, NY (US); Jason T. Wertz, Pleasant Valley, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/181,963

(22) Filed: Jun. 14, 2016

(65) Prior Publication Data

US 2017/0355800 A1    Dec. 14, 2017

(51) Int. Cl.
*C08F 251/02* (2006.01)
*C08L 51/02* (2006.01)

(52) U.S. Cl.
CPC ............ *C08F 251/02* (2013.01); *C08L 51/02* (2013.01); *C08L 2201/02* (2013.01)

(58) Field of Classification Search
CPC .................................................. C08F 251/02
See application file for complete search history.

(56) References Cited

U.S. PATENT DOCUMENTS

| | | | | | |
|---|---|---|---|---|---|
| 3,475,357 | A | * | 10/1969 | Kuzmak | C08F 251/02 264/195 |
| 3,687,878 | A | * | 8/1972 | Imoto | C08B 15/00 527/312 |
| 3,889,678 | A | * | 6/1975 | Chatterjee | A61L 15/28 525/54.3 |
| 4,200,557 | A | * | 4/1980 | Chatterjee | A61F 13/202 525/54.23 |
| 4,243,769 | A | * | 1/1981 | Pritchett | C08G 81/00 524/33 |
| 4,360,635 | A | * | 11/1982 | Alberts | C08F 255/026 525/54.21 |
| 4,427,809 | A | * | 1/1984 | Alberts | C08F 251/02 524/37 |
| 4,555,468 | A | * | 11/1985 | Yano | C08F 251/02 430/157 |
| 5,049,634 | A | * | 9/1991 | Tsai | C08F 251/02 527/312 |
| 5,095,054 | A | * | 3/1992 | Lay | A01N 25/10 264/328.14 |
| 5,487,942 | A | * | 1/1996 | Gomibuchi | D06M 11/28 428/326 |
| 5,981,067 | A | * | 11/1999 | Seethamraju | B27N 3/007 428/326 |
| 6,599,961 | B1 | | 7/2003 | Pienkowski et al. | |
| 7,265,175 | B2 | | 9/2007 | Winey et al. | |
| 8,288,457 | B2 | | 10/2012 | Simard et al. | |
| 8,367,161 | B2 | | 2/2013 | Ma et al. | |
| 8,545,963 | B2 | | 10/2013 | Alberding et al. | |
| 8,815,144 | B2 | | 8/2014 | Harmon et al. | |
| 9,127,158 | B1 | * | 9/2015 | Boday | C08L 67/02 |
| 9,540,568 | B1 | * | 1/2017 | Boday | C09K 21/14 |
| 2002/0025420 | A1 | * | 2/2002 | Wanat | B32B 27/08 428/213 |
| 2003/0092834 | A1 | * | 5/2003 | Charmot | C08B 3/22 525/54.2 |
| 2004/0202632 | A1 | * | 10/2004 | Gott | A61K 8/732 424/70.13 |
| 2009/0062474 | A1 | * | 3/2009 | Nando | C08L 15/00 525/265 |
| 2011/0201755 | A1 | * | 8/2011 | Hamad | B82Y 30/00 525/63 |
| 2013/0061774 | A1 | * | 3/2013 | Landry | C08F 251/02 106/204.2 |
| 2014/0194617 | A1 | * | 7/2014 | Boday | C09K 21/14 536/62 |
| 2015/0080486 | A1 | * | 3/2015 | Kasowski | C09K 21/14 521/135 |
| 2015/0274848 | A1 | | 10/2015 | Boday et al. | |
| 2016/0102163 | A1 | * | 4/2016 | Boday | C09K 21/14 525/91 |

FOREIGN PATENT DOCUMENTS

| | | |
|---|---|---|
| CN | 101955572 A | 1/2011 |
| CN | 105297286 A | 2/2016 |
| WO | 2014070092 A1 | 5/2014 |

OTHER PUBLICATIONS

"Poly(Methyl Methacrylate)-Grafted Cellulose Nanocrystals: One-Step Synthesis, Nanocomposite Preparation, and Characterization", The Canadian Journal of Engineering, vol. 94, Issue 5, May 2016, onlinelibrary.wiliey.com.

Roy, et al., "Graft Polymerization: Grafting Poly(styrene) from Cellulose Via Reversible Addition—Fragmentation Chain Transfer (RAFT) Polymerization", American Chemical Society, Macromolecules 2005, vol. 38, 10 pp.

Terlemezyan, et al., Preparation and Investigation of Methyl Methacrylate-Budadience-Styrene Graft Copolymers and their Mixtures with Poly(Vinyl Chloride), ACTA Polymerica vol. 40, No. 4, 1989, 3 pp.

Liu, et al., "Toughness and Transparency of Poly(Vinyl Chloride)/Methyl Methacrylate-Butadiene-Styrene Blends with Varied Shell Phase Composition of Core-Shell Theories", Polymer-Plastics Technology and Engineering, vol. 48, 2009, 5 pp.

(Continued)

*Primary Examiner* — Liam J Heincer

(74) *Attorney, Agent, or Firm* — Patterson + Sheridan, LLP

(57) ABSTRACT

In an example, a material includes a cellulosic nanomaterial and multiple polymer chains chemically bonded to the cellulosic nanomaterial. Each polymer chain includes a styrene-butadiene copolymer.

15 Claims, 6 Drawing Sheets

(56) References Cited

OTHER PUBLICATIONS

Yu, et al., "Synthesis of Surface-Functionalized Polystyrene-co-butadiene) Nanoparticles via Controlled /Living Radical Miniemulsion Copolymerization . . . "Journal of Macromolecular Science, Part A: Pure and Applied Chemistry, 2012, vol. 49, 8 pp.

* cited by examiner

FLAME-RETARDANT IMPACT MODIFIER

I. FIELD OF THE DISCLOSURE

The present disclosure relates generally to flame-retardant impact modifiers (e.g., for blending with a polymer).

II. BACKGROUND

Plastics are commonly derived from petrochemicals, resulting in price fluctuations and supply chain instability. Replacing non-renewable petroleum-based polymers with polymers derived from renewable resources may be desirable. However, in certain contexts, there are limited alternatives to petroleum-based polymers. To illustrate, particular renewable polymers may have less than desirable material properties, such as low impact resistance or flame resistance. Such material properties can sometimes be improved by blending the polymers with additive compounds. The additive compounds generally include other polymers. If the additive compounds are not from renewable sources, blending renewable polymers with the additive compounds reduces the portion of non-renewable petroleum-based polymers replaced with polymers derived from renewable resources.

III. SUMMARY OF THE DISCLOSURE

According to an embodiment, a renewable material can be used as an additive to other polymers, especially other renewable polymers. When blended with another polymer, the renewable material improves impact resistance of the blend. Further, in some embodiments, the renewable material improves other material properties of the blend. For example, the renewable material may include flame retardant functional groups which may increase the flame retardancy or flame quenching properties of the blend. Additionally, the renewable material may include a rheology modifier, which may improve rheological properties of the blend.

In a particular embodiment, a material (e.g., a polymer blend additive) includes a cellulosic nanomaterial and multiple polymer chains chemically bonded to the cellulosic nanomaterial. Each polymer chain includes a styrene-butadiene copolymer.

In another embodiment, a polymer blend includes at least one polymer and an impact modifier blended with the at least one polymer. The impact modifier includes a cellulosic nanomaterial and multiple polymer chains chemically bonded to the cellulosic nanomaterial. Each polymer chain includes a styrene-butadiene copolymer.

In another embodiment, a method includes combining a methyl methacrylate-functionalized cellulosic nanomaterial with at least a first monomer and a second monomer. The method also includes initiating a reaction of the methyl methacrylate-functionalized cellulosic nanomaterial, the first monomer and the second monomer to form a reactant including multiple polymer chains chemically bonded to the methyl methacrylate-functionalized cellulosic nanomaterial.

A renewable polymer blend additive can be used to improve material properties of other polymers. The renewable polymer blend additive may be especially useful when blended with renewable polymers to maintain an overall percentage of renewables in a final product. The renewable polymer blend additive may enable use of renewable polymers in circumstances where non-renewable polymers may otherwise be used due to inability of renewable polymers to satisfy specified material properties, such as impact resistance, flame retardance, etc.

IV. BRIEF DESCRIPTION OF THE DRAWINGS

V. DETAILED DESCRIPTION

Figure 1:
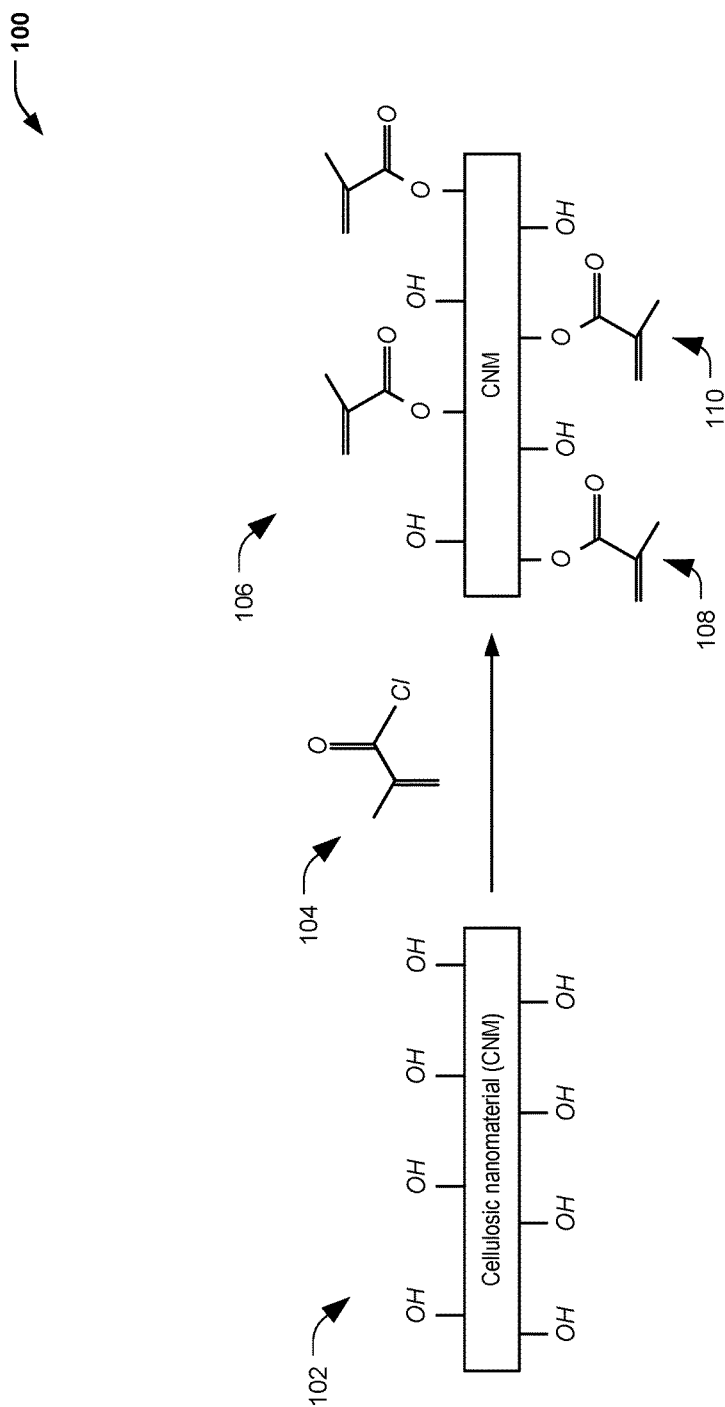
FIG. 1 is a chemical reaction diagram illustrating a particular embodiment of preparation of a methyl methacrylate-functionalized cellulosic nanomaterial.

The present disclosure relates to polymeric materials, especially renewable polymers. One hurdle in the use of renewable polymers in some industries is that many renewable polymers tend to have unsatisfactory ignition resistance characteristics. One approach that is used to address this concern is to blend a renewable polymer with another material (e.g., a filler) that has flame retardant properties. In some cases, such fillers may include relatively small molecules in the form of particles. In such cases, to provide adequate flame retardance, loading levels of these flame retardant fillers can run as high as 30%. Such high loading levels can compromise mechanical properties of the resulting polymer blend. For example, the impact resistance, tensile strength, modulus, or other properties of such a polymer blend may be unsatisfactory.

Thus, for some bio-derived or renewable polymers, adding a filler to improve a polymer blend's mechanical properties (such as impact resistance) may degrade the polymer blend's ignition resistance. Additionally, adding a filler to improve the polymer blend's ignition resistance may degrade the polymer blend's mechanical properties. Embodiments disclosed herein provide a polymeric filler material that improves both mechanical properties and ignition resistance of a polymer blend. The polymeric filler material can be bio-derived or renewable. Accordingly, adding the polymeric filler material to a polymer blend does not decrease a percentage or proportion of renewable content of the polymer blend.

In a particular example, the polymeric filler material incorporates orthogonal functionality on an impact modifier to address shortcomings present in other filler materials. To illustrate, to form the polymeric filler material a cellulosic nanomaterial (such as a cellulose nanocrystal or cellulose nanofiber material) may be functionalized with methyl methacrylate. The functionalized cellulosic nanomaterial may be copolymerized with constituent monomers to form a styrene-butadiene-based impact modifier material. In some examples, the polymeric filler material may be rendered flame retardant by copolymerizing the constituent monomers with small amounts of a monomer that has flame retardant characteristics, such as an acrylic, styrenic, or otherwise vinylic monomers containing flame-quenching functionalities (e.g., phosphorus, halogens, etc.) and capable of polymerizing via radical polymerization. The resulting flame-retardant impact modifier may be blended with one or more polymers (e.g., bio-renewable polymers, such as polylactic acid (PLA), polycaprolactone (PCL), polyamide (PA), polyglycolic acid (PGA), polyhydroxybutyrate (PHB), polyhydroxyalkanoates (PHA), polyethylene terephtalate (PET), polypropylene (PP), polyethylene (PE), PLA/starch material (PSM), polycarbonate (PC), or a combination or copolymer thereof).

In some implementations, the polymeric filler material may be formed by functionalizing the cellulosic nanomaterial with methyl methacrylate via nucleophilic acyl substitution. For example, the cellulosic nanomaterial may be reacted with an acyl halide (e.g., methacryloyl chloride), an acrylic acid (e.g., methacrylic acid), or an acrylic anhydride (e.g., methacrylic anhydride). The methyl methacrylate-functionalized cellulosic nanomaterial may be copolymerized with a mixture of styrene and butadiene. To make the resultant product flame retardant, a flame retardant monomer may also be copolymerized with the styrene, the butadiene and the methyl methacrylate-functionalized cellulosic nanomaterial. The copolymerization may be initiated using a thermal initiator, a UV initiator, or another radical polymerization initiator. After polymerization, the resultant product (e.g., a cellulosic nanomaterial impact modifier/filler with the flame retardant groups coupled to poly(methyl methacrylate-co-styrene-co-butadiene)) may be compounded with a polymer or polymer blend.

In some implementations, the methyl methacrylate-functionalized cellulosic nanomaterial may have unreacted hydroxyl groups (i.e., hydroxyl groups of the cellulosic nanomaterial that were not replaced with methyl methacrylate groups). In such implementations, rather than (or in addition to) blending, the cellulosic nanomaterial impact modifier/filler may be reacted with a polymer, polymer blend, or one or more monomers to covalently link the cellulosic nanomaterial impact modifier/filler to the polymer, polymer blend or monomers via the previously unreacted hydroxyl groups.

FIG. 1 is a chemical reaction diagram 100 illustrating a particular embodiment of preparation of a methyl methacrylate-functionalized cellulosic nanomaterial. As illustrated in FIG. 1, a cellulosic nanomaterial 102 may be reacted to form a methyl methacrylate-functionalized cellulosic nanomaterial 106. For example, the cellulosic nanomaterial 102 may undergo nucleophilic acyl substitution when mixed with an acyl halide, such as methacryloyl chloride 104. In other examples, the cellulosic nanomaterial 102 may be reacted with methacrylic acid or methacrylic anhydride to form the methyl methacrylate-functionalized cellulosic nanomaterial 106.

The cellulosic nanomaterial 102 may include or correspond to a cellulose nanocrystal, a cellulose nanofiber, or another cellulosic material having a characteristic dimension (e.g., a length) on the order of a nanometer (e.g., less than about 1000 nanometers, less than about 100 nanometers, or less than about 10 nanometers). The cellulosic nanomaterial 102 may include a plurality of hydroxyl groups. During the reaction illustrated in FIG. 1, the oxygen of the hydroxyl group attacks the acyl carbon. This nucleophilic attack may be promoted by a base or a catalyst, such as pyridine. After the nucleophilic attack, the halide (e.g., the Cl) is eliminated (e.g., leaves to potentially form HCl). If a catalyst such as pyridine is used the catalyst may also act as a proton scavenger, neutralizing the HCl and helping the reaction proceed By controlling stoichiometric ratios of the acyl halide and the cellulosic nanomaterial 102, the reaction can be used to produce a cellulosic nanomaterial with multiple methyl methacrylate functional groups, such as the illustrative methyl methacrylate-functionalized cellulosic nanomaterial 106 of FIG. 1.

As described further below, the methyl methacrylate groups of the methyl methacrylate-functionalized cellulosic nanomaterial 106 may be used to modify the cellulosic nanomaterial 102 to form an additive or filler having particular properties, such as flame-retardance or impact resistance.

Figure 2:
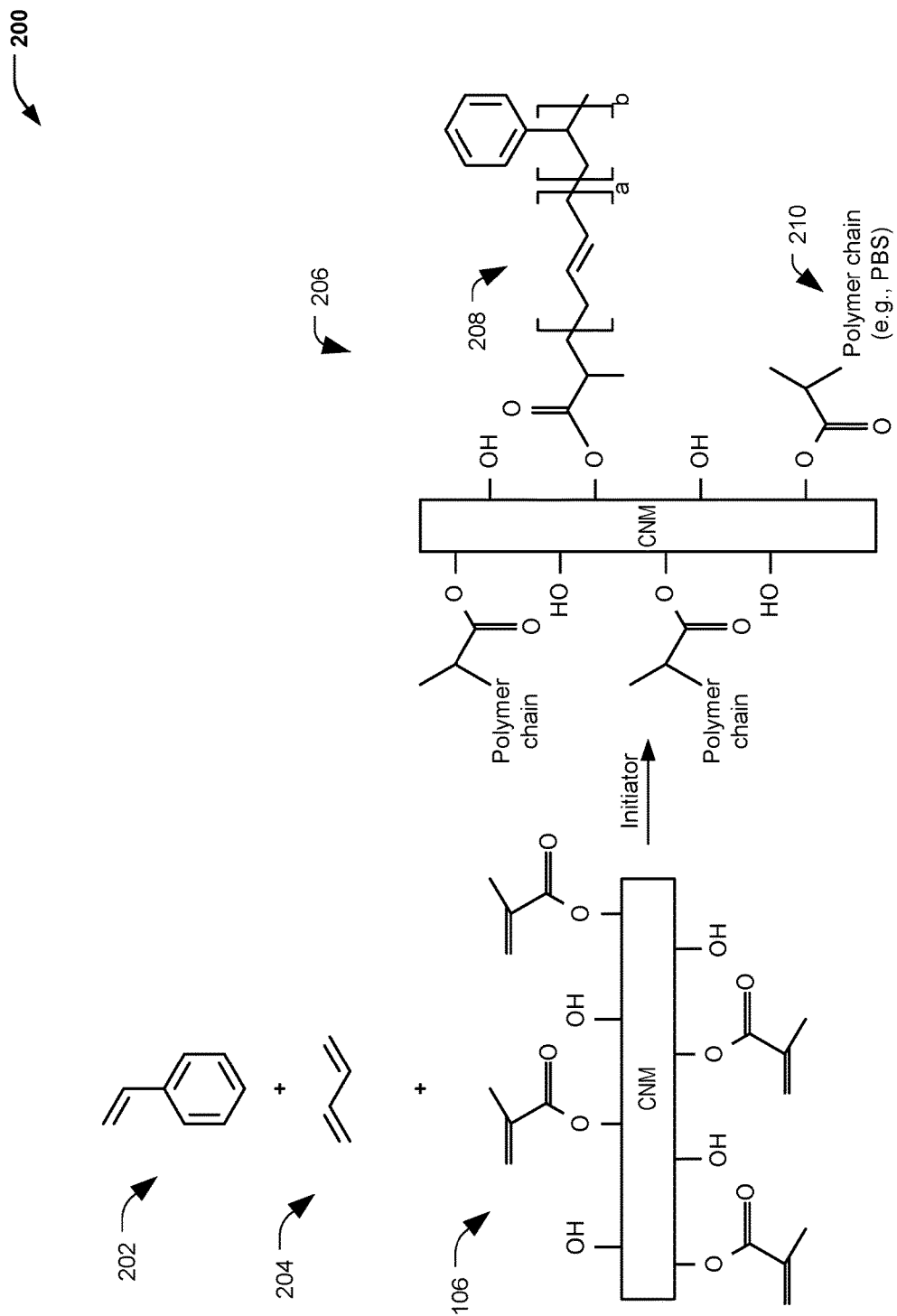
FIG. 2 is a chemical reaction diagram illustrating a particular embodiment of preparation of an impact modifier compound.

FIG. 2 is a chemical reaction diagram 200 illustrating a particular embodiment of preparation of a compound that may be used as an impact modifier. As illustrated in FIG. 2, the methyl methacrylate-functionalized cellulosic nanomaterial 106 may be reacted with a plurality of monomer compounds to form a material 206 (e.g., the compound that can be used as an impact modifier). For example, as illustrated in FIG. 2, the monomer compounds may include a styrene 202 (or another compound having a styrenic functional group) and butadiene 204. In this example, the styrene 202 and butadiene 204 may react to form a plurality of polymer chains, such as a first polymer chain 208 and a second polymer chain 210. In the example of FIG. 2, each polymer chain 208, 210 includes a copolymer of styrene 202 and butadiene 204 (e.g., polybutadiene-styrene (PBS)).

The polymer chains 208, 210 are chemically bonded to the cellulosic nanomaterial 102 via the methyl methacrylate groups (e.g., each polymer chain 208, 210 is coupled to the cellulosic nanomaterial 102 via a corresponding methyl methacrylate group). Thus, the material 206 includes the cellulosic nanomaterial 102 with multiple polymer chains 208, 210 chemically bonded to the cellulosic nanomaterial 102 via the methyl methacrylate groups.

As described above, the polymer chains 208, 210 may include a styrene-butadiene copolymer. Styrene-butadiene copolymers tend to have good impact resistance. Accordingly, the material 206 may be blended with another polymer (or set of polymers) as an additive to improve impact resistance of the blended polymer(s). If the styrene 202, the butadiene 204, and the cellulosic nanomaterial 102 are derived from renewable sources, the material 206 can be used as a renewable impact modifier. Thus, blending the material 206 with another polymer causes a quantity of renewable content in a final product (including the other polymer and the material 206) to increase. Thus, as much of the material 206 as desired to achieve particular impact resistance levels can be added without negatively affecting the proportion of renewable content in the final product.

Additionally, cellulosic nanomaterials, such as the cellulosic nanomaterial 102, are sometimes added to polymers to modify rheology characteristics of the polymers. Thus, the material 206 may be added to a polymer blend as a rheology modifier, as an impact modifier, or as both a rheology modifier and an impact modifier. Using a single material (e.g., the material 206) as both a rheology modifier and an impact modifier may reduce costs associated with formulating a polymer blend (e.g., by simplifying supply chain management, reducing a number or cost of polymer additives, etc.).

Figure 3:
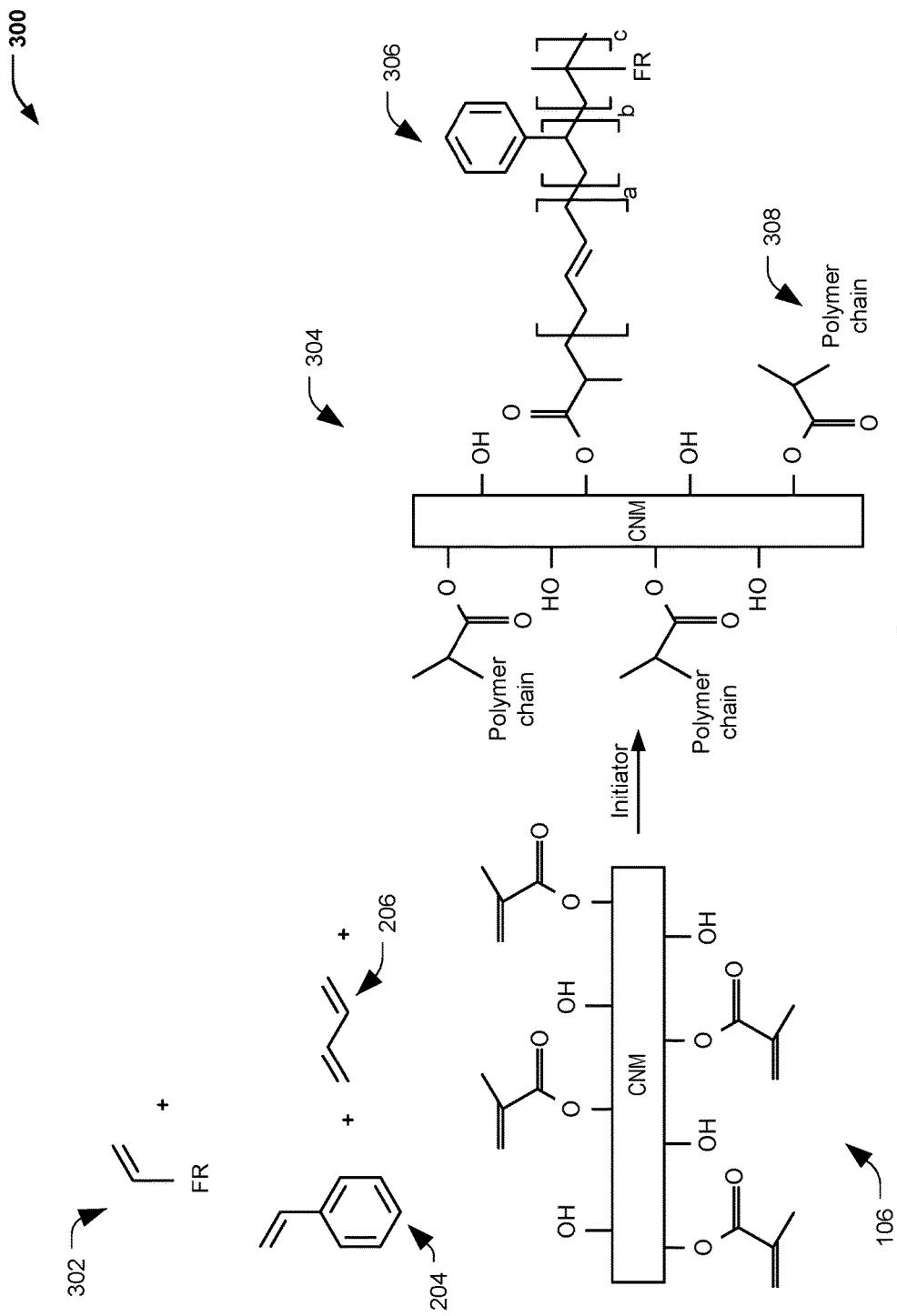
FIG. 3 is a chemical reaction diagram illustrating a particular embodiment of preparation of a flame-retardant impact modifier compound.

FIG. 3 is a chemical reaction diagram 300 illustrating a particular embodiment of preparation of a compound that may be used as a flame-retardant impact modifier. As illustrated in FIG. 3, the methyl methacrylate-functionalized cellulosic nanomaterial 106 may be reacted with a plurality of monomer compounds to form a material 304 (e.g., the compound that can be used as a flame-retardant impact modifier). For example, as illustrated in FIG. 3, the monomer compounds may include styrene 202 (or another compound having a styrenic functional group), butadiene 204, and a flame-retardant monomer 302. The flame-retardant monomer 302 includes a compound that is capable of radical polymerization and that has a flame-retardant or a flame-quenching functional group (FR). For example, the flame-retardant monomer 302 may include an acrylic compound, a styrenic compound, or an otherwise vinylic compound, that has a flame-retardant or a flame-quenching functional group. The flame-retardant or flame-quenching functional group may include a phosphorous-based or halogen-based group. Specific, non-limiting, examples of flame-retardant monomers 302 are described with reference to FIGS. 4 and 5.

In the example of FIG. 3, the styrene 202, the butadiene 204, and the flame-retardant monomer 302 may react to form a plurality of polymer chains, such as a first polymer chain 306 and a second polymer chain 308. Thus, each of the polymer chains 306, 308 includes a copolymer of styrene 202, butadiene 204, and the flame-retardant monomer 302. The polymer chains 306, 308 are chemically bonded to the cellulosic nanomaterial 102 via the methyl methacrylate groups (e.g., each polymer chain 306, 308 is coupled to the cellulosic nanomaterial 102 via a corresponding methyl methacrylate group). Thus, the material 304 includes the cellulosic nanomaterial 102 with multiple flame-retardant and impact resistant polymer chains 306, 308 chemically bonded to the cellulosic nanomaterial 102 via the methyl methacrylate groups.

Flame retardant properties of the material 304 may be related to a quantity of the flame-retardant monomer 302 used in the reaction illustrated in FIG. 3. For example, reacting the styrene 202, the butadiene 204, and the methyl methacrylate-functionalized cellulosic nanomaterial 106 with more of the flame-retardant monomer 302 may result in the material 304 having more of the flame retardant functional groups, which may improve flame retardancy of the material 304. Conversely, reacting the styrene 202, the butadiene 204, and the methyl methacrylate-functionalized cellulosic nanomaterial 106 with less of the flame-retardant monomers 302 may result in the material 304 having fewer of the flame retardant functional groups, which may decrease flame retardancy of the material 304.

The material 304 may be blended with another polymer (or set of polymers) as an additive to improve impact resistance of the blended polymer(s), to improve flame retardancy of the blended polymer(s), to modify rheological properties of the blended polymer(s), or a combination thereof. If the styrene 202, the butadiene 204, the flame-retardant monomers 302, and the cellulosic nanomaterial 102 are derived from renewable sources, the material 304 can be used as a renewable filler in the blended polymer(s). Thus, blending the material 304 with another polymer causes a quantity of renewable content in a final product (including the other polymer and the material 304) to increase. Accordingly, as much of the material 304 as desired to achieve particular impact resistance levels, particular flame retardance characteristics, or both, can be added without negatively affecting the proportion of renewable content in the final product. Using a single material (e.g., the material 304) as a rheology modifier, an impact modifier, and a flame retardance modifier may reduce costs associated with formulating a polymer blend (e.g., by simplifying supply chain management, reducing a number or cost of polymer additives, etc.).

Figure 4:
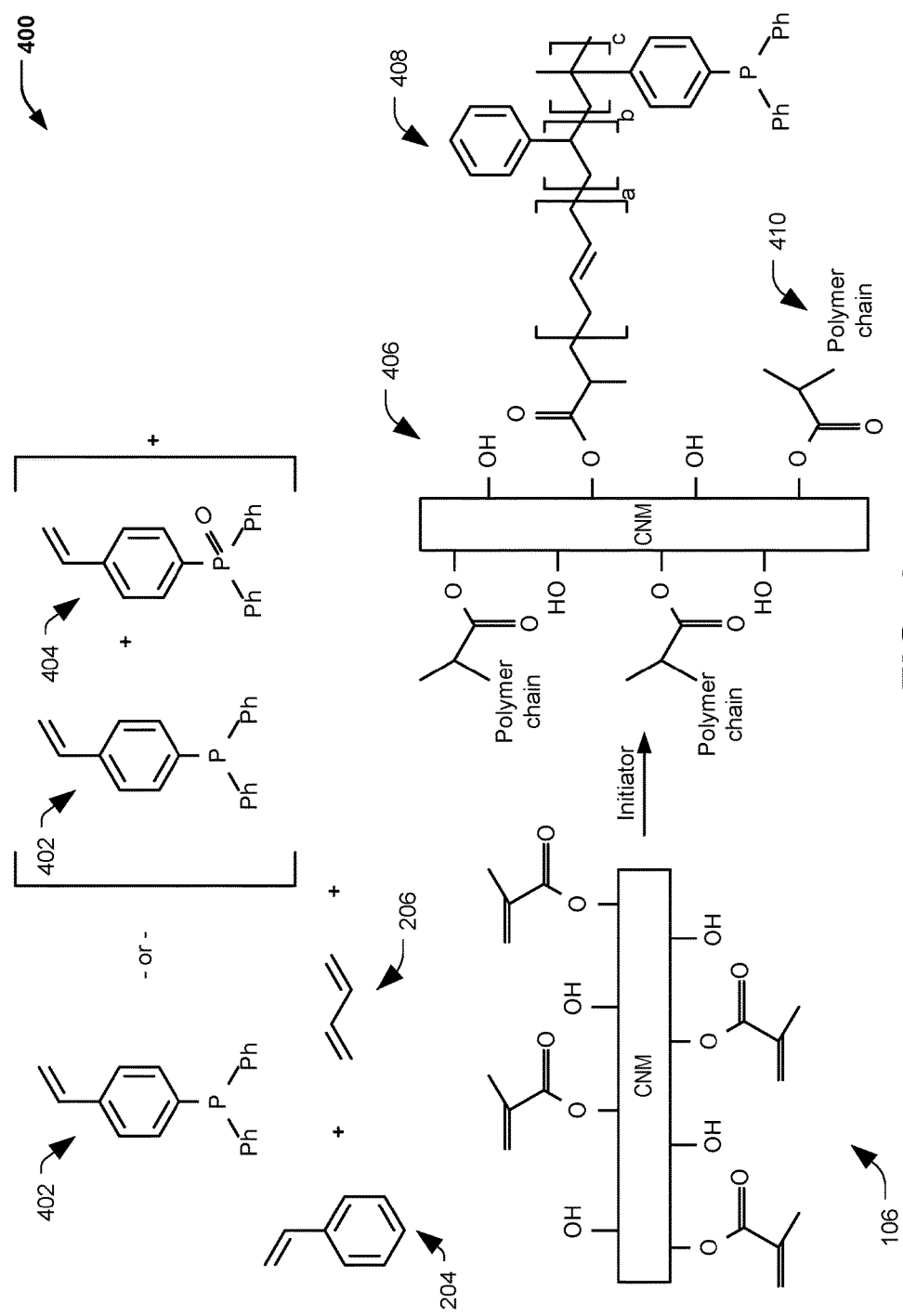
FIG. 4 is a chemical reaction diagram illustrating another particular embodiment of preparation of a flame-retardant impact modifier compound.

FIG. 4 is a chemical reaction diagram 400 illustrating another particular embodiment of preparation of a flame-retardant impact modifier compound. FIG. 4 illustrates a specific, non-limiting example of flame retardant monomers that can be used to form the flame-retardant impact modifier compound. In FIG. 4, the methyl methacrylate-functionalized cellulosic nanomaterial 106 may be reacted with the styrene 202 (or another compound having a styrenic functional group), the butadiene 204, and a flame-retardant monomer or multiple flame retardant monomers. In FIG. 4, the flame retardant monomer(s) include 4-(diphenylphosphino)styrene 402, or a combination of 4-(diphenylphosphino)styrene 402 and diphenyl(4-vinylphenyl)phosphine oxide 404.

In the example of FIG. 4, the styrene 202, the butadiene 204, and the flame-retardant monomer(s) may react to form a plurality of polymer chains, such as a first polymer chain 408 and a second polymer chain 410. Thus, each of the polymer chains 408, 410 includes a copolymer of styrene 202, butadiene 204, and the flame-retardant monomer(s). The polymer chains 408, 410 are chemically bonded to the cellulosic nanomaterial 102 via the methyl methacrylate groups (e.g., each polymer chain 408, 410 is coupled to the cellulosic nanomaterial 102 via a corresponding methyl methacrylate group). Thus, the material 406 includes the cellulosic nanomaterial 102 with multiple flame-retardant and impact resistant polymer chains 408, 410 chemically bonded to the cellulosic nanomaterial 102 via the methyl methacrylate groups.

Flame retardant properties of the material 406 may be related to a quantity of the flame-retardant monomer(s) used in the reaction illustrated in FIG. 4. For example, reacting the styrene 202, the butadiene 204, and the methyl methacrylate-functionalized cellulosic nanomaterial 106 with more of the flame-retardant monomer(s) may result in the material 406 having more of the flame retardant functional groups, which may improve flame retardancy of the material 406. Conversely, reacting the styrene 202, the butadiene 204, and the methyl methacrylate-functionalized cellulosic nanomaterial 106 with less of the flame-retardant monomer(s) may result in the material 406 having fewer of the flame retardant functional groups, which may decrease flame retardancy of the material 406.

The material 406 may be blended with another polymer (or set of polymers) as an additive to improve impact resistance of the blended polymer(s), to improve flame retardance of the blended polymer(s), to modify rheological properties of the blended polymer(s), or a combination thereof. If the styrene 202, the butadiene 204, the flame-retardant monomer(s), and the cellulosic nanomaterial 102 are derived from renewable sources, the material 406 can be used as a renewable filler in the blended polymer(s). Thus, blending the material 406 with another polymer causes a quantity of renewable content in a final product (including the other polymer and the material 406) to increase. Accordingly, as much of the material 406 as desired to achieve particular impact resistance levels, particular flame retardance characteristics, or both, can be added without negatively affecting the proportion of renewable content in the final product. Using a single material (e.g., the material 406) as a rheology modifier, an impact modifier, and a flame retardance modifier may reduce costs associated with formulating a polymer blend (e.g., by simplifying supply chain management, reducing a number or cost of polymer additives, etc.).

Figure 5:
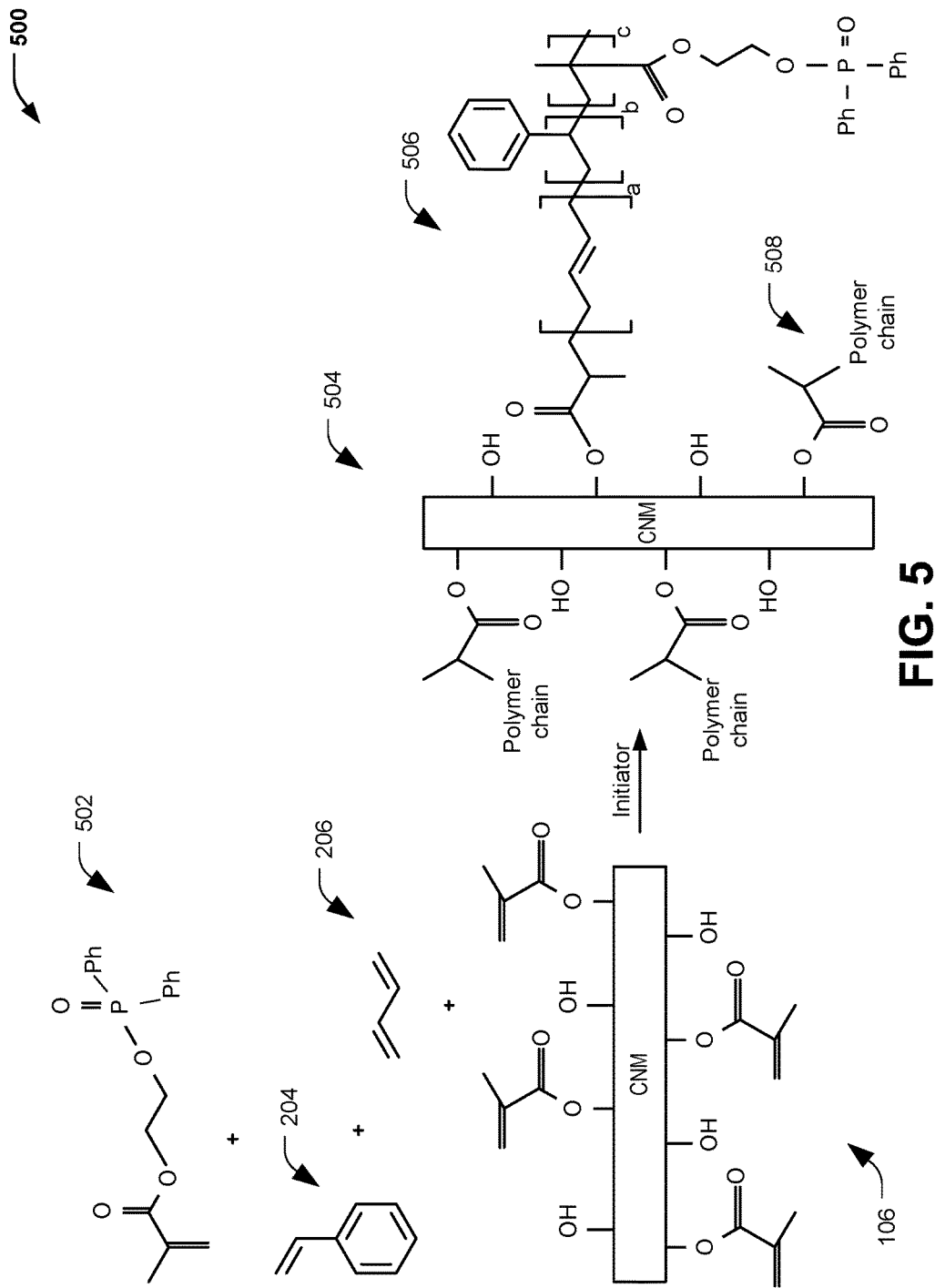
FIG. 5 is a chemical reaction diagram illustrating another particular embodiment of preparation of a flame-retardant impact modifier compound.

FIG. 5 is a chemical reaction diagram 500 illustrating another particular embodiment of preparation of a flame-retardant impact modifier compound. FIG. 5 illustrates another specific, non-limiting example of a flame retardant monomer 502 that can be used to form the flame-retardant impact modifier compound. In FIG. 5, the methyl methacrylate-functionalized cellulosic nanomaterial 106 may be reacted with the styrene 202 (or another compound having a styrenic functional group), the butadiene 204, and the flame retardant monomer 502. In FIG. 5, the flame retardant monomer 502 includes an acrylic monomer with a phosphorus-based flame retardant moiety.

In the example of FIG. 5, the styrene 202, the butadiene 204, and the flame-retardant monomer 502 may react to form a plurality of polymer chains, such as a first polymer chain 506 and a second polymer chain 508. Thus, each of the polymer chains 506, 508 includes a copolymer of styrene 202, butadiene 204, and the flame-retardant monomer 502. The polymer chains 506, 508 are chemically bonded to the cellulosic nanomaterial 102 via the methyl methacrylate groups (e.g., each polymer chain 506, 508 is coupled to the cellulosic nanomaterial 102 via a corresponding methyl methacrylate group). Thus, the material 504 includes the cellulosic nanomaterial 102 with multiple flame-retardant and impact resistant polymer chains 506, 508 chemically bonded to the cellulosic nanomaterial 102 via the methyl methacrylate groups.

Flame retardant properties of the material 504 may be related to a quantity of the flame-retardant monomer(s) used in the reaction illustrated in FIG. 4. For example, reacting the styrene 202, the butadiene 204, and the methyl methacrylate-functionalized cellulosic nanomaterial 106 with more of the flame-retardant monomer 502 may result in the material 504 having more of the flame retardant functional groups, which may improve flame retardancy of the material 504. Conversely, reacting the styrene 202, the butadiene 204, and the methyl methacrylate-functionalized cellulosic nanomaterial 106 with less of the flame-retardant monomer 502 may result in the material 504 having fewer of the flame retardant functional groups, which may decrease flame retardancy of the material 504.

The material 504 may be blended with another polymer (or set of polymers) as an additive to improve impact resistance of the blended polymer(s), to improve flame retardance of the blended polymer(s), to modify rheological properties of the blended polymer(s), or a combination thereof. If the styrene 202, the butadiene 204, the flame-retardant monomer 502, and the cellulosic nanomaterial 102 are derived from renewable sources, the material 504 can be used as a renewable filler in the blended polymer(s). Thus, blending the material 504 with another polymer causes a quantity of renewable content in a final product (including the other polymer and the material 504) to increase. Accordingly, as much of the material 504 as desired to achieve particular impact resistance levels, particular flame retardance characteristics, or both, can be added without negatively affecting the proportion of renewable content in the final product. Using a single material (e.g., the material 504) as a rheology modifier, an impact modifier, and a flame retardance modifier may reduce costs associated with formulating a polymer blend (e.g., by simplifying supply chain management, reducing a number or cost of polymer additives, etc.).

Figure 6:
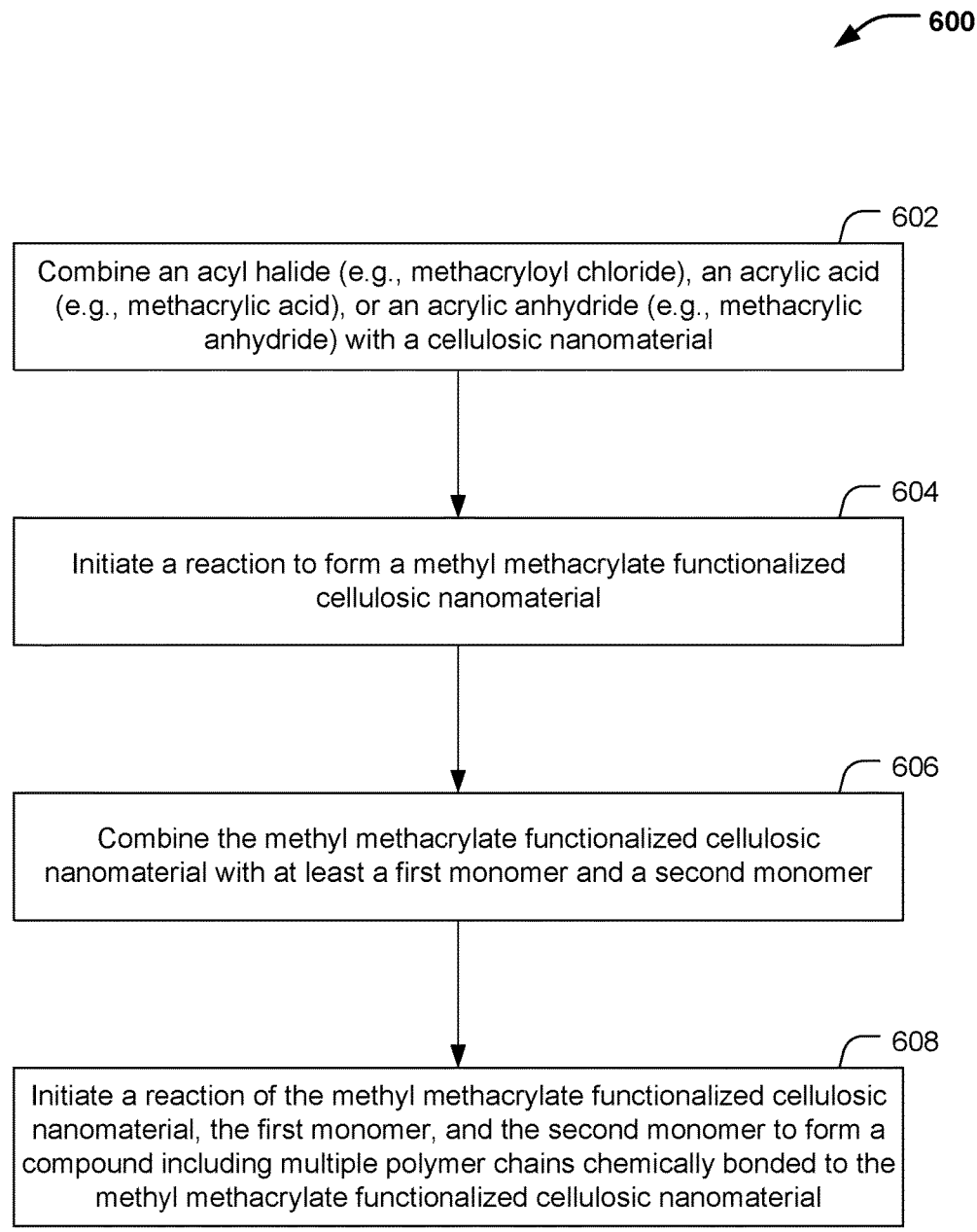
FIG. 6 is a flow diagram illustrating a particular embodiment of a method of forming an impact modifier compound.

FIG. 6 is a flow diagram illustrating a particular embodiment of a method 600 of forming an impact modifier compound. The method 600 may be used to form any one or more of the material 206 of FIG. 2, the material 304 of FIG. 3, the material 406 of FIG. 4, or the material 504 of FIG. 5. Alternatively or in addition, a portion of the method 600 may be used to form the methyl methacrylate-functionalized cellulosic nanomaterial 106 of FIG. 1.

The method 600 may include, at 602, combining an acyl halide (e.g., methacryloyl chloride), an acrylic acid (e.g., methacrylic acid), or an acrylic anhydride (e.g., methacrylic anhydride) with a cellulosic nanomaterial. For example, as illustrated in FIG. 1, the methacryloyl chloride 104 may be combined with the cellulosic nanomaterial 102. The method 600 may also include, at 604, initiating a reaction to form a methyl methacrylate-functionalized cellulosic nanomaterial. For example, the acyl halide, the acrylic acid, or the acrylic anhydride may react with the cellulosic nanomaterial to form the methyl methacrylate-functionalized cellulosic nanomaterial 106 of FIG. 1. In some examples, rather than forming the methyl methacrylate-functionalized cellulosic nanomaterial via reaction of the cellulosic nanomaterial with one or more reagents, the methyl methacrylate-functionalized cellulosic nanomaterial may be obtained via an alternate mechanism, such as purchased as a reagent compound for use in forming an impact modifier.

The method 600 includes, at 606, combining the methyl methacrylate-functionalized cellulosic nanomaterial with at least a first monomer and a second monomer. For example, the methyl methacrylate-functionalized cellulosic nanomaterial 106 may be combined with styrene, butadiene, one or more other radical polymerizable monomers, or a combination thereof. In some embodiments, the monomers may include an acrylic compound, a styrenic compound, or an otherwise vinylic compound, that has a flame-retardant or flame-quenching functional group.

The method 600 also includes, at 608, initiating a reaction (e.g., a radical polymerization reaction) of the methyl methacrylate-functionalized cellulosic nanomaterial, the first monomer and the second monomer to form a compound including multiple polymer chains chemically bonded to the methyl methacrylate-functionalized cellulosic nanomaterial. For example, as described with reference to FIG. 2, the methyl methacrylate-functionalized cellulosic nanomaterial 106, the styrene 202 and the butadiene 204 may be reacted to form the material 206, which includes multiple polymer chains 208, 210 chemically bonded to the methyl methacrylate-functionalized cellulosic nanomaterial. As another example, as described with reference to FIG. 3, the methyl methacrylate-functionalized cellulosic nanomaterial 106, the styrene 202, the butadiene 204, and the flame-retardant monomer 302 may be reacted to form the material 304, which includes multiple polymer chains 306, 308 chemically bonded to the methyl methacrylate-functionalized cellulosic nanomaterial. Additional examples are described with reference to FIGS. 4 and 5.

In some embodiments, the method 600 may also include blending the compound including multiple polymer chains chemically bonded to the methyl methacrylate-functionalized cellulosic nanomaterial (e.g., the material 206, the material 304, the material 406, or the material 504) with one or more base polymers to form a polymer blend. In such embodiments, the compound may function as a filler for the polymer blend. The filler may modify rheological characteristics of polymer blends relative to the base polymer(s). Alternatively, or in addition, the filler may modify impact resistance characteristics of polymer blends relative to the base polymer(s). Alternatively, or in addition, the filler may modify fire-retardant characteristics of polymer blends relative to the base polymer(s). In particular embodiments, reactants used to form the filler can be renewable (e.g., biologically derived). In such embodiments, adding the filler to the polymer blend may improve characteristics of the polymer blend without decreasing a proportion of renewable materials in the polymer blend.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The invention claimed is:

1. A material comprising
   a cellulosic nanomaterial; and
   multiple polymer chains chemically bonded to the cellulosic nanomaterial, each polymer chain comprising a styrene-butadiene copolymer and chemically bonded to the cellulosic material via a corresponding methyl methacrylate group.

2. The material of claim 1, wherein at least one of the polymer chains further comprises a halogen-containing compound.

3. The material of claim 1, wherein at least one of the polymer chains further comprises a phosphorus-containing compound.

4. The material of claim 1, wherein at least one of the polymer chains comprises a copolymer of styrene, butadiene and a fire-retardant monomer.

5. The material of claim 1, wherein at least one of the polymer chains further comprises 4-(diphenylphosphino) styrene.

6. The material of claim 1, wherein at least one of the polymer chains further comprises at least one of a phosphorus-containing acrylic monomer or a phosphorus-containing styrenic monomer.

7. A polymer blend comprising:
   at least one polymer;
   an impact modifier blended with the at least one polymer, the impact modifier comprising:
      a cellulosic nanomaterial; and
      multiple polymer chains chemically bonded to the cellulosic nanomaterial, each polymer chain comprising a styrene-butadiene copolymer and chemically bonded to the cellulosic nanomaterial via a corresponding methyl methacrylate group.

8. The polymer blend of claim 7, wherein the impact modifier further comprises a fire-retardant compound chemically bonded to the cellulosic nanomaterial.

9. The polymer blend of claim 8, wherein the fire-retardant compound includes a halogen-containing compound chemically bonded to at least one of the polymer chains.

10. The polymer blend of claim 8, wherein the fire-retardant compound includes at least one of a phosphorus-containing acrylic monomer or a phosphorus-containing styrenic monomer.

11. The polymer blend of claim 8, wherein the at least one polymer comprises a bio-renewable polymer.

12. The polymer blend of claim 8, wherein the at least one polymer comprises polylactic acid (PLA), polycaprolactone (PCL), polyamide (PA), polyglycolic acid (PGA), polyhydroxybutyrate (PHB), polyhydroxyalkanoates (PHA), polyethylene terephtalate (PET), polypropylene (PP), polyethylene (PE), plastarch material (PSM), polycarbonate (PC), or a combination or copolymer thereof.

13. A method comprising
   combining a methyl methacrylate-functionalized cellulosic nanomaterial with at least a first monomer including styrene and a second monomer including butadiene; and
   initiating a reaction of the methyl methacrylate-functionalized cellulosic nanomaterial, the first monomer and the second monomer to form a compound including multiple polymer chains chemically bonded to the methyl methacrylate-functionalized cellulosic nanomaterial.

14. The method of claim 13, further comprising, before combining the methyl methacrylate-functionalized cellulosic nanomaterial with at least the first monomer and the second monomer:
   combining an acyl halide and a cellulosic nanomaterial; and
   initiating a reaction of the acyl halide and the cellulosic nanomaterial to form the methyl methacrylate-functionalized cellulosic nanomaterial.

15. The method of claim 13, wherein a fire-retardant compound is combined with the methyl methacrylate-functionalized cellulosic nanomaterial, the first monomer, and the second monomer, and at least one of the polymer chains includes the fire-retardant compound.

* * * * *